United States Patent
Kim

(10) Patent No.: US 10,396,915 B2
(45) Date of Patent: Aug. 27, 2019

(54) INTERFERENCE CANCELLATION REPEATER

(71) Applicants: SOLID, INC., Gyeonggi-do (KR); SOLIDSYSTEMS CO., LTD., Gyeonggi-do (KR)

(72) Inventor: Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/540,639

(22) PCT Filed: Dec. 4, 2015

(86) PCT No.: PCT/KR2015/013240
§ 371 (c)(1),
(2) Date: Sep. 22, 2017

(87) PCT Pub. No.: WO2016/108448
PCT Pub. Date: Jul. 7, 2016

(65) Prior Publication Data
US 2018/0026731 A1    Jan. 25, 2018

(30) Foreign Application Priority Data

Dec. 30, 2014   (KR) .................. 10-2014-0194356
Apr. 8, 2015    (KR) .................. 10-2015-0049638

(51) Int. Cl.
*H04B 17/318* (2015.01)
*H04B 7/155* (2006.01)

(52) U.S. Cl.
CPC ....... *H04B 17/318* (2015.01); *H04B 7/15578* (2013.01)

(58) Field of Classification Search
CPC ..... H04B 17/318; H04B 7/15578; H04L 1/00; H04L 27/0008; H04L 27/0012;
(Continued)

(56) References Cited

U.S. PATENT DOCUMENTS 9,941,951 B2 *   4/2018   Jang ................. H04B 7/15585
2006/0172781 A1 *  8/2006   Mohebbi ............ H04B 7/15535
                                                          455/571

(Continued)

FOREIGN PATENT DOCUMENTS

JP      2014-204300 A    10/2014
KR   10-2007-0106363 A   11/2007
(Continued)

OTHER PUBLICATIONS

Korea Office Action for Application No. 10-2015-0049638 dated Jan. 31, 2017.
(Continued)

*Primary Examiner* — Tan H Trinh
(74) *Attorney, Agent, or Firm* — Sughrue Mion, PLLC

(57) ABSTRACT

An interference cancellation repeater according to the inventive concept includes: a first transmission/reception processing unit configured to adjust a gain of a radio frequency (RF) input signal input via a link antenna communicatively coupled to a base station; an interference canceller configured to cancel and output an interference signal from an output signal of the first transmission/reception processing unit; and a gain controller configured to extract a signal with constant magnitude regardless of a change in user traffic from the output signal of the interference canceller, and to adjust the gain of the RF input signal to a predetermined level by controlling the first transmission/reception processing unit based on the extracted signal.

6 Claims, 4 Drawing Sheets

(58) Field of Classification Search
CPC ..... H04L 5/0007; H04L 5/0028; H04L 5/006; H04L 5/0064; H04L 5/0066; H04L 5/0085; H04L 5/0087; H04L 5/0091; H04W 16/14
USPC ...... 455/69, 522, 7, 9, 10, 63.1, 67.13, 13.1, 455/13.4
See application file for complete search history.

(56) References Cited

U.S. PATENT DOCUMENTS

| | | | | |
|---|---|---|---|---|
| 2007/0155314 A1* | 7/2007 | Mohebbi | ............ | H04B 7/15507 455/11.1 |
| 2009/0207776 A1* | 8/2009 | Baik | ............ | H04B 7/15585 370/315 |
| 2010/0118922 A1* | 5/2010 | Ahn | ............ | H04B 7/15585 375/214 |
| 2012/0115412 A1* | 5/2012 | Gainey | ............ | H04B 3/23 455/7 |
| 2012/0170493 A1* | 7/2012 | Watanabe | ............ | H03G 3/3052 370/294 |
| 2013/0077502 A1* | 3/2013 | Gainey | ............ | H04B 7/15578 370/252 |
| 2013/0077556 A1* | 3/2013 | Gore | ............ | H04B 7/15578 370/315 |
| 2014/0335779 A1 | 11/2014 | Kim et al. | | |
| 2015/0038071 A1* | 2/2015 | Kang | ............ | H04B 7/15585 455/24 |
| 2015/0124313 A1* | 5/2015 | Takahashi | ............ | H01S 3/06754 359/337 |
| 2017/0366247 A1* | 12/2017 | Kim | ............ | H04B 7/15507 |
| 2018/0034533 A1* | 2/2018 | Lee | ............ | H04B 7/155 |

FOREIGN PATENT DOCUMENTS

| | | |
|---|---|---|
| KR | 10-2010-0039578 A | 4/2010 |
| KR | 10-1243333 B1 | 3/2013 |

OTHER PUBLICATIONS

International Search Report of PCT/KR2015/013240 dated Apr. 7, 2016.

* cited by examiner

INTERFERENCE CANCELLATION REPEATER

CROSS-REFERENCE TO RELATED APPLICATIONS

This application is a National Stage of International Application No. PCT/KR2015/013240, filed Dec. 4, 2015, and claims priority from Korean Patent Application No. 10-2014-0194356, filed Dec. 30, 2014, and Korean Patent Application No. 10-2015-0049638, filed Apr. 8, 2015, the contents of which are incorporated herein by reference in their entireties.

BACKGROUND

1. Field

The inventive concept relates to an interference cancellation repeater, and more particularly, to an interference cancellation repeater that controls a gain of an input signal to a constant level.

2. Description of the Related Art

Generally, in order to expand service coverage of a base station or to improve service quality, a repeater is used in a radio-shadow area where intensity of a signal is weak or a signal is difficult to reach. The repeater may be a radio frequency (RF) repeater. The RF repeater receives a base station signal transmitted from the base station via a link antenna, amplifies the received base station signal, and then transmits the amplified signal to a terminal via a service antenna, and further receives a signal transmitted from a user terminal via the service antenna, amplifies the received signal, and then transmit the amplified signal to the base station via the link antenna, thereby repeating communication between the base station and the terminal.

The RF repeater is easy to install because the RF repeater transmits and receives signals wirelessly via the link antenna and the service antenna to/from the base station and the user terminal, respectively. However, due to interference between the link antenna and the service antenna, deterioration of a service signal at high power and oscillation by repetitive reception and amplification of the deteriorated signal may occur, and thus an output gain was limited. Also, due to a spatial restriction according to a demand for miniaturization, it was difficult to secure isolation between the link antenna and the service antenna.

An interference cancellation repeater has been proposed as an alternative, and the interference cancellation repeater may increase isolation by removing interference signals from an input signal, for example, signals that are radiated via the service antenna (or the link antenna) and re-input to the link antenna (or the service antenna) through various paths, thereby increasing an output gain, preventing oscillation, and miniaturizing.

Since the interference cancellation repeater receives the base station signal wirelessly and uses an identical frequency for an input signal and an output signal as in a general RF repeater, magnitude of a signal input to the interference cancellation repeater may change due to fading. When the magnitude of the input signal changes and exceeds a rated input power of the interference cancellation repeater, the interference cancellation repeater saturates. Therefore, the interference cancellation repeater needs to adjust an input signal gain in response to the change in the magnitude of the input signal due to the fading.

However, when the interference cancellation repeater supports a mobile communication service, for example, an LTE service, in which user traffic changes significantly, the magnitude of the input signal may be changed not only due to the fading but also due to an abrupt change in user traffic. Here, since it is difficult to discriminate whether the change in the magnitude of the input signal is due to the fading or the change in user traffic, it is difficult to appropriately adjust an input signal gain of the interference cancellation repeater in response to an excessive input due to the fading.

SUMMARY

The inventive concept is directed to an interference cancellation repeater capable of appropriately corresponding to a change in magnitude of an input signal due to fading.

According to an aspect of the inventive concept, there is provide an interference cancellation repeater includes a first transmission/reception processing unit configured to adjust a gain of a radio frequency (RF) input signal input via a link antenna communicatively coupled to a base station; an interference canceller configured to cancel and output an interference signal from an output signal of the first transmission/reception processing unit; and a gain controller configured to extract a signal with constant magnitude regardless of a change in user traffic from an output signal of the interference canceller, and to adjust the gain of the RF input signal to a predetermined level by controlling the first transmission/reception processing unit based on the extracted signal.

According to an embodiment, the extracted signal may be a synchronization signal for synchronization between the base station and a user terminal.

According to an embodiment, the extracted signal may be a reference signal of the base station.

According to an embodiment, the gain controller may include an extractor configured to extract the signal with constant magnitude regardless of the change in user traffic from the output signal of the interference canceller; an acquirer configured to calculate a power value of the extracted signal, and compare the calculated power value with a predetermined reference power value to acquire a gain-adjusted value; and a controller configured to control the first transmission/reception processing unit such that the first transmission/reception processing unit adjusts the gain of the RF input signal according to the acquired gain-adjusted value.

According to an embodiment, the reference power value may be a rated input power value of the interference cancellation repeater.

According to an embodiment, the first transmission/reception processing unit may include an amplifier configured to amplify the RF input signal by low-noise amplification; an attenuator configured to adjust a gain of the low-noise-amplified RF input signal; and an analog-to-digital converter configured to digitize the gain-adjusted RF input signal, wherein the gain controller may be configured to adjust the gain of the RF input signal to a predetermined level by controlling the attenuator.

According to an embodiment of the inventive concept, an interference cancellation repeater maintains a gain of an input signal at a rated level based on a signal having constant magnitude irrespective of a change in user traffic, so that even when magnitude of an input signal changes due to fading, service coverage may be maintained constant and service stability may be improved.

BRIEF DESCRIPTION OF THE FIGURES

A brief description of each drawing is provided to more fully understand drawings recited in the detailed description.

DETAILED DESCRIPTION OF EXEMPLARY EMBODIMENTS

Figure 1:
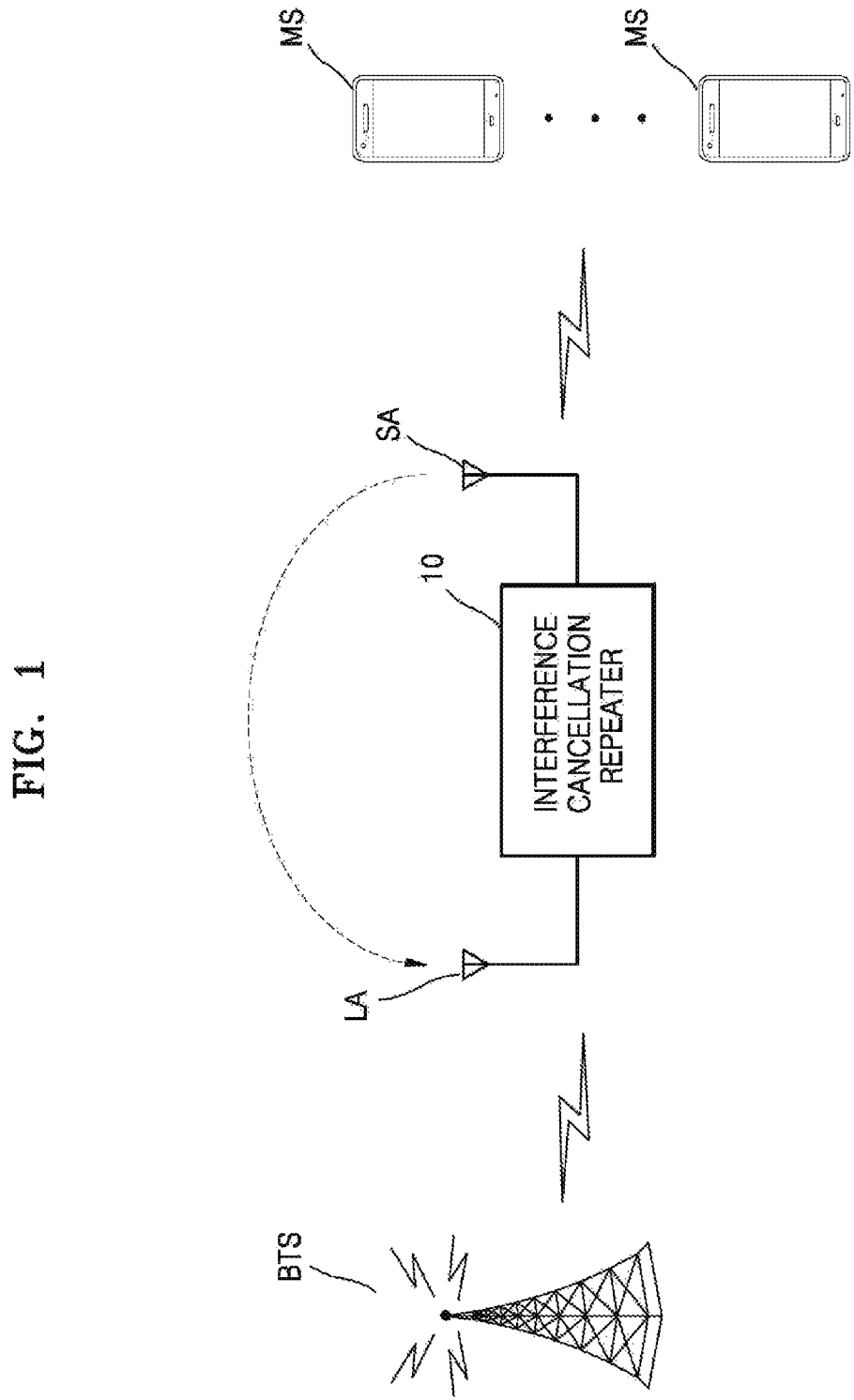
FIG. 1 is a view for explaining a repeat environment of an interference cancellation repeater, according to an embodiment of the inventive concept.

Since the inventive concept may have diverse modified embodiments, preferred embodiments are illustrated in the drawings and are described in the detailed description. However, this does not limit the inventive concept within specific embodiments and it should be understood that the inventive concept covers all the modifications, equivalents, and replacements within the idea and technical scope of the inventive concept.

In the description of the inventive concept, certain detailed explanations of the related art are omitted when it is deemed that they may unnecessarily obscure the essence of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

An interference cancellation repeater according to an embodiment of the inventive concept may support mobile communication services used worldwide. For example, the interference cancellation repeater may support a time division duplex (TDD) service as well as a frequency division duplex (FDD) service, a very-high frequency (VHF), an ultra-high frequency (UHF), and frequencies of 700 MHz, 800 MHz, 850 MHz, 900 MHz, 1900 MHz, 2100 MHz, and 2600 MHz bands. Furthermore, the interference cancellation repeater may support a number of mobile communication services such as a typical analog mobile communication service, that is, an advanced mobile phone service (AMPS), digital time-division multiple access (TDMA), code-division multiple access (CDMA), wideband code-division multiple access (WCDMA), high-speed downlink packet access (HSDPA), long-term evolution (LTE), LTE-advanced (LTE-A), and so on.

Hereinafter, embodiments of the inventive concept will be described in detail.

FIG. 1 is a view for explaining a repeat environment of an interference cancellation repeater 10, according to an embodiment of the inventive concept.

Referring to FIG. 1, the interference cancellation repeater 10 may amplify a radio frequency (RF) input signal received via a link antenna LA in a case of downlink and transmit the amplified RF input signal to a user terminal MS via a service antenna SA. The RF input signal may include a base station signal transmitted from a base station BTS and an interference signal in which signals radiated via the service antenna SA are re-input to the link antenna LA. Furthermore, the interference cancellation repeater 10 may oscillate as the base station signal and the interference signal are amplified together by a high power amplifier (not shown). The interference cancellation repeater 10 may solve the oscillation problem by including an interference canceller 130 (see FIGS. 2 and 3) capable of canceling the interference signal from the RF input signal on a side of the link antenna LA.

As shown in FIG. 1, the interference cancellation repeater 10 receives signals wirelessly via the link antenna LA, thereby causing a fading phenomenon, and magnitude of the RF input signal input to the link antenna LA may vary. Here, the magnitude of the RF input signal may vary due to a change in user traffic, i.e., a user data amount. The interference cancellation repeater 10 according to the inventive concept includes a gain controller 170 (see FIGS. 2 and 3) for adjusting a gain of the RF input signal to a predetermined level by detecting the change in magnitude of the RF input signal due to fading based on a signal with constant magnitude regardless of a change in user traffic to maintain coverage constant. This will be described in detail later below with reference to FIG. 2 and the like.

Meanwhile, the interference cancellation repeater 10 may amplify the RF input signal received via the service antenna SA in a case of uplink and transmit the amplified RF input signal to the base station BTS via the link antenna LA. Although not shown in FIG. 1, in the case of uplink, signals radiated via the link antenna LA may be input to the service antenna SA through a wireless environment to form an interference signal, and thus, the interference cancellation repeater 10 may oscillate as a signal of the user terminal MS and the interference signal are included in the input signals received via the service antenna SA and are amplified together by the high power amplifier. Furthermore, as shown in FIG. 1, as the interference cancellation repeater 10 receives signals wirelessly via the service antenna SA, magnitude of the RF input signal input to the service antenna SA may change due to a fading phenomenon or a change in user traffic.

Although not shown in FIG. 1A, the interference cancellation repeater 10 cancels the interference signal through the interference canceller 130 (see FIGS. 2 and 3) in the downlink described above in the uplink to prevent oscillation, and controls an input signal gain through the gain controller 170 (see FIGS. 2 and 3) to secure service stability. However, the inventive concept is not limited thereto, and the interference cancellation repeater 10 may have at least one of the interference canceller and the gain controller for each of the downlink and the uplink.

Figure 2:
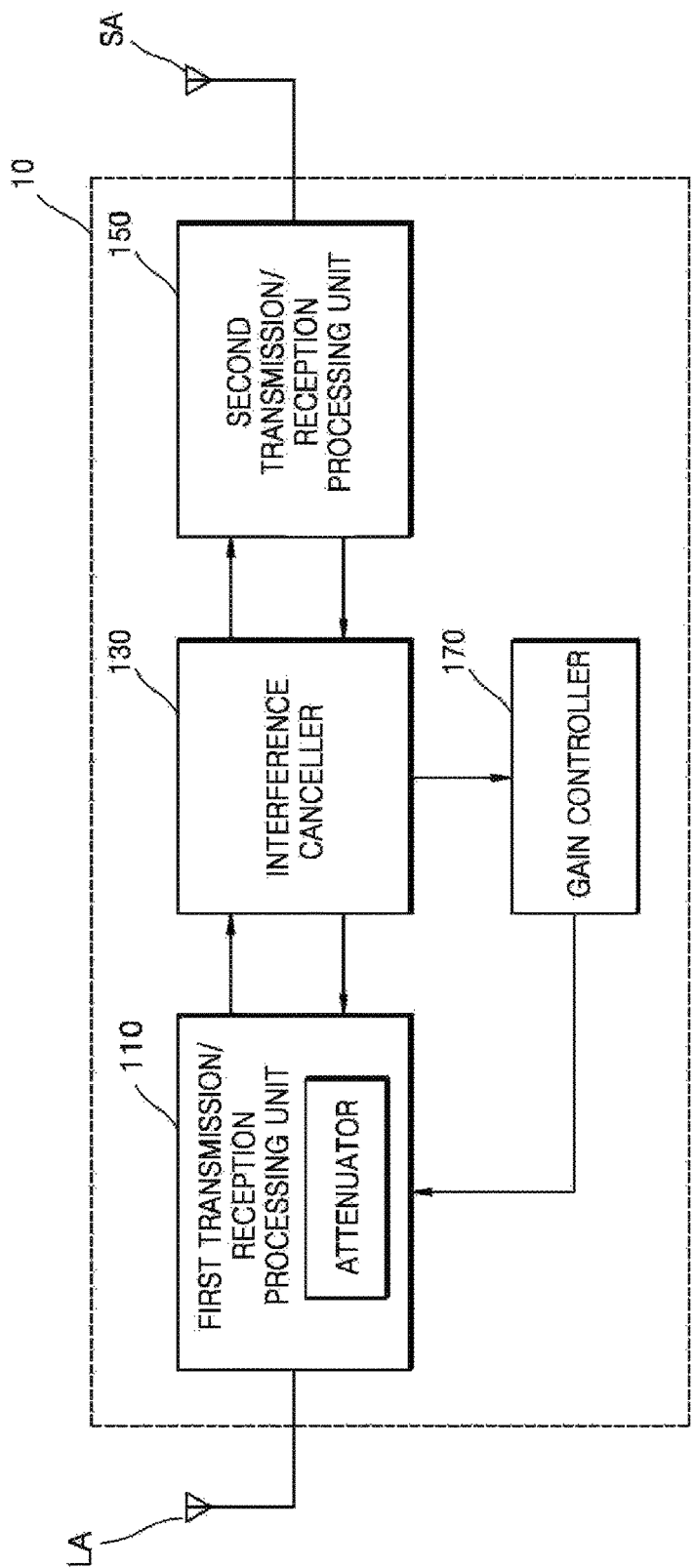
FIG. 2 is a schematic block diagram of an interference cancellation repeater, according to an embodiment of the inventive concept.

FIG. 2 is a schematic block diagram of the interference cancellation repeater 10, according to an embodiment of the inventive concept. FIG. 2 mainly describes signal processing of a downlink path in the interference cancellation repeater 10 for convenience of explanation, and signal processing of an uplink path in the interference cancellation repeater 10 corresponds to the signal processing of the downlink path. Therefore, a detailed description thereof will not be given herein. Meanwhile, FIG. 2 illustrates that the interference cancellation repeater 10 includes one link antenna LA and one service antenna SA, but the inventive concept is not limited thereto. The interference cancellation repeater 10 may include at least two link antennas and at least two service antennas. Here, the interference canceller described later below may be implemented for each signal path between the corresponding link antenna and service antenna, or may be integrally implemented for at least two signal paths. Similarly, the gain controller described later below may also be implemented for each signal path between the corresponding link antenna and service antenna, or may be integrally implemented for at least two signal paths.

Referring to FIG. 2, the interference cancellation repeater 10 may include the link antenna LA, a first transmission/reception processing unit 110, an interference canceller 130, a second transmission/reception processing unit 150, a gain controller 170, and the service antenna SA.

The first transmission/reception processing unit 110 may receive an RF input signal via the link antenna LA communicatively coupled to the base station BTS (see FIG. 1). The RF input signal may include a base station signal and an interference signal in which signals radiated via the service antenna SA are re-input to the link antenna LA.

The first transmission/reception processing unit 110 may adjust a gain of the RF input signal. The first transmission/reception processing unit 110 may include an attenuator 113 and may adjust the gain of the RF input signal through the attenuator 113. The first transmission/reception processing unit 110 may digitize and output the RF input signal whose gain is adjusted by the attenuator 113. A specific configuration of the first transmission/reception processing unit 110 will be described in more detail later below with reference to FIG. 3.

The interference canceller 130 may cancel the interference signal from an output signal of the first transmission/reception processing unit 110, that is, the digitized RF input signal. In more detail, the interference canceller 130 may estimate a signal corresponding to the interference signal based on an output signal of the interference canceller 130, that is, the digitized RF input signal from which the interference signal has been canceled, and may cancel the interference signal from the digitized RF input signal using the estimated signal. Accordingly, the interference canceller 130 may output a digitized base station signal.

The second transmission/reception processing unit 150 may convert the output signal of the interference canceller 130, that is, the digitized base station signal, into an analog signal. The second transmission/reception processing unit 150 may amplify the analog-converted base station signal and transmit the result via the service antenna SA. Although not shown in FIG. 1, the second transmission/reception processing unit 150 may include a digital-to-analog converter for converting the digitized base station signal into an analog signal, a frequency-up converter for up-converting the analog-converted base station signal into a signal of a radio frequency band, and a power amplifier for amplifying the up-converted base station signal. The frequency-up converter may be optionally omitted. Also, although not shown in FIG. 1, the second transmission/reception processing unit 150 may further include an isolator or the like for protecting the power amplifier at a rear end of the power amplifier.

The gain controller 170 may extract a signal with constant magnitude regardless of a change in user traffic from the output signal of the interference canceller 130 to identify whether a change in magnitude of the RF input signal is due to fading, and adjust the gain of the RF input signal to a predetermined level by controlling the first transmission/reception processing unit 110 based on the extracted signal. In more detail, the gain controller 170 may control the attenuator 113 of the first transmission/reception processing unit 110 based on the extracted signal to adjust the gain of the changed RF input signal to a rated level. The gain controller 170 will be described in more detail later below with reference to FIG. 3.

Figure 3:
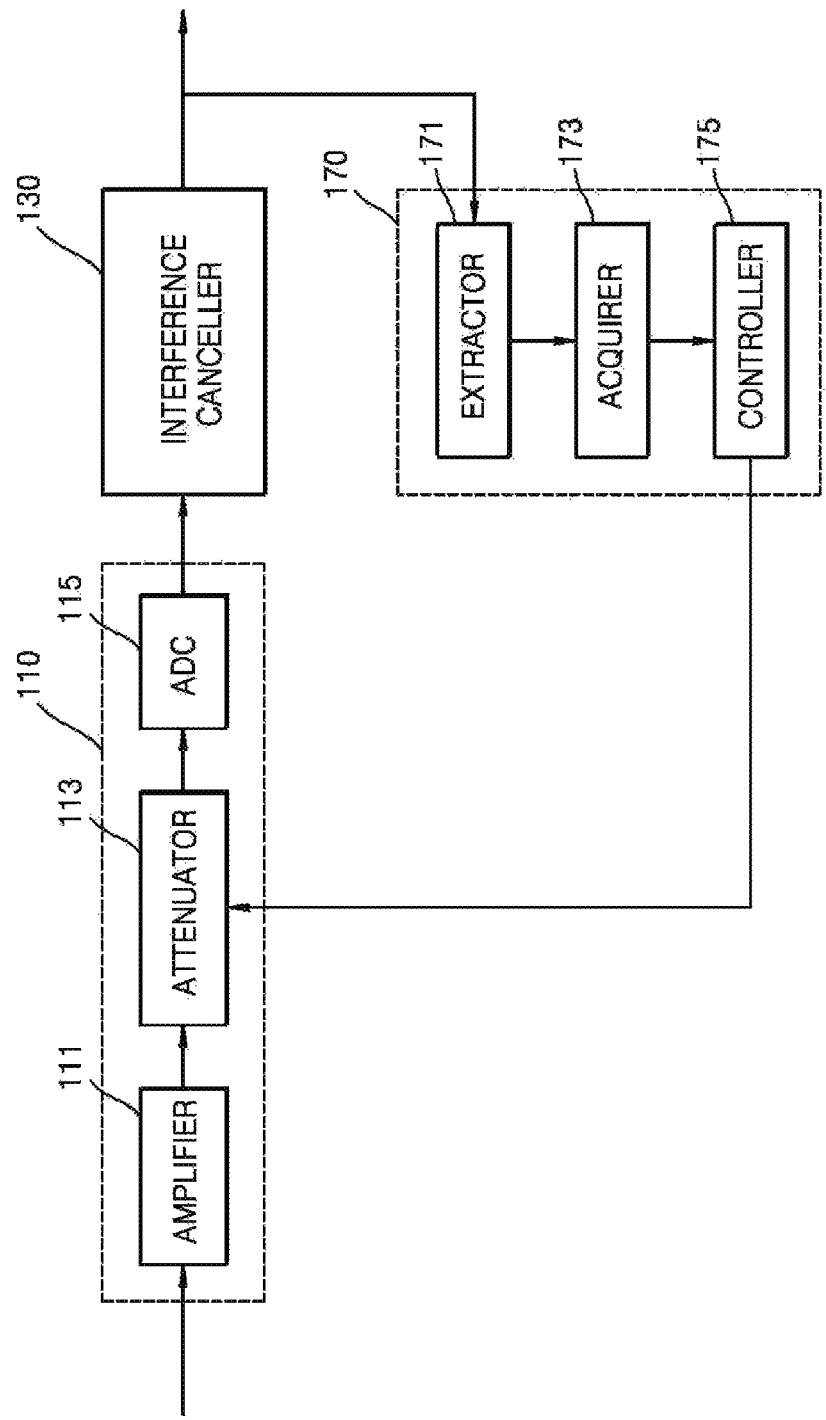
FIG. 3 is a view for explaining a detailed configuration of a portion of the interference cancellation repeater of FIG. 2.

FIG. 3 is a view for explaining a detailed configuration of a portion of the interference cancellation repeater 10 of FIG. 2. FIG. 3 is described with reference to FIG. 2 and repeated descriptions thereof are omitted for convenience of description. The first transmission/reception processing unit 110 and the gain controller 170 will be mainly described.

Referring to FIGS. 2 and 3, the first transmission/reception processing unit 110 may include an amplifier 111, an attenuator 113, and an analog-to-digital converter (ADC) 115. The amplifier 111 may amplify the RF input signal input to the interference cancellation repeater 10 via the link antenna LA by low-noise amplification, that is, by minimizing noise of the RF input signal. The attenuator 113 may adjust a gain of the amplified RF input signal. The ADC 115 may digitize the gain-adjusted RF input signal.

Meanwhile, although not shown in FIG. 3, the first transmission/reception processing unit 110 may further include a filter for selecting a frequency band required in the RF input signal at a front end of the amplifier 111 and a frequency-down converter for converting the gain-adjusted RF input signal into a signal of an intermediate frequency band between the attenuator 113 and the ADC 115. Here, the frequency-down converter may be optionally omitted.

The gain controller 170 may include an extractor 171, an acquirer 173, and a controller 175.

The extractor 171 may extract a signal with constant magnitude regardless of a change in user traffic from the output signal of the interference canceller 130, that is, the digitized RF input signal from which the interference signal has been canceled.

In some embodiments, the extracted signal may be a signal for synchronization of a base station and a user terminal. For example, when the interference cancellation repeater 10 provides a Long-Term Evolution (LTE) service, the extracted signal may be a primary synchronization signal (PSS) and/or a secondary synchronization signal (SSS).

In another embodiment, the extracted signal may be a reference signal of the base station. For example, when the interference cancellation repeater 10 provides the LTE service, the extracted signal may be a cell-specific reference signal.

Meanwhile, the extracted signal may be a pilot signal when the interference cancellation repeater 10 provides a wideband code-division multiple access (WCDMA)/code-division multiple access (CDMA) service.

The acquirer 173 may calculate a power value of a signal extracted by the extractor 171 and compare the power value of the calculated signal with a reference power value, to acquire a gain-adjusted value. The power value of the calculated signal may correspond to magnitude of an original signal (i.e., the base station signal) changed due to fading. The reference power value may be a rated input power value in the interference cancellation repeater 10, and the gain-adjusted value may be a value corresponding to a difference between a current power value of the original signal changed due to fading and a rated power value.

The controller 175 may control the first transmission/reception processing unit 110, in more detail, the attenuator 113, to adjust the gain of the RF input signal according to the gain-adjusted value acquired by the acquirer 173. Thus, the attenuator 113 adjusts a changed gain of the RF input signal to a value corresponding to a rated gain.

As such, the interference cancellation repeater 10 identifies when magnitude of an input signal changes due to a change in user traffic and when magnitude of an input signal changes due to fading, so that the gain controller 170 may maintain the gain of the input signal at the rated gain based on a synchronization signal or the like even when magnitude of the input signal changes due to fading, thereby maintaining service coverage constant and improving service stability.

Figure 4:
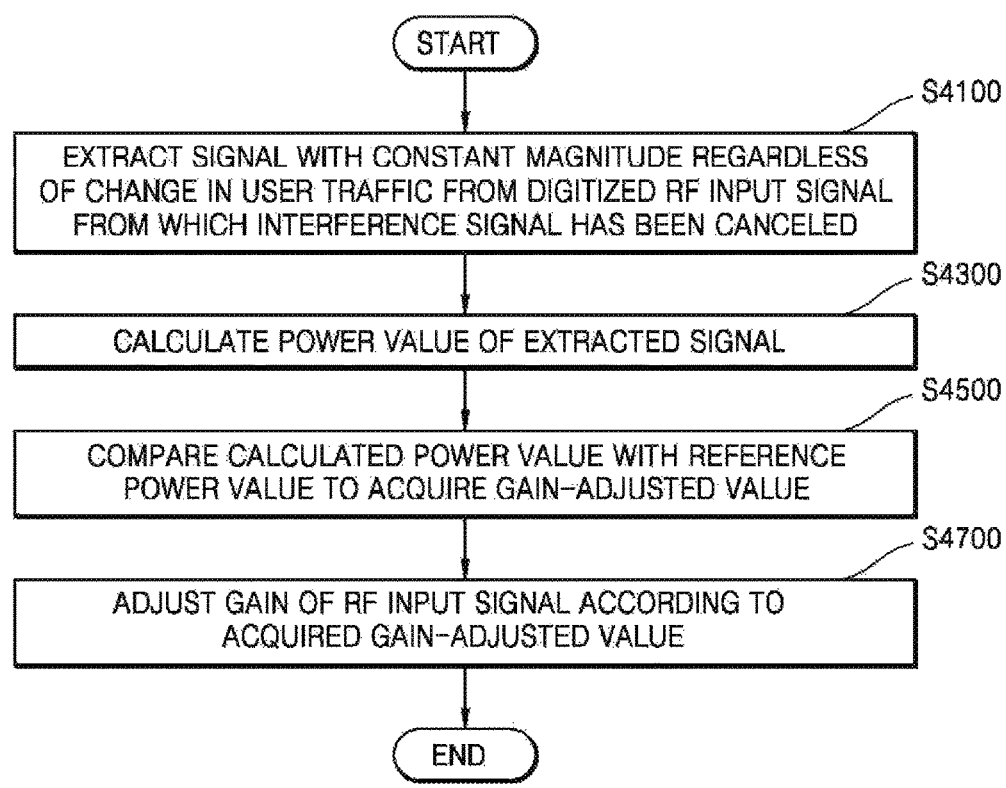
FIG. 4 is a flowchart of a method of controlling an input signal gain of an interference cancellation repeater, according to an embodiment of the inventive concept.

FIG. 4 is a flowchart of a method of controlling an input signal gain of the interference cancellation repeater 10, according to an embodiment of the inventive concept. Referring to FIG. 4, the method of controlling an input signal gain of the interference cancellation repeater 10 according to an embodiment of the inventive concept includes operations of time series processing in the interference cancellation repeater 10 of FIGS. 1 to 3. Therefore, even if the descriptions are omitted below, it will be understood that the contents described above with respect to the interference cancellation repeater 10 of FIGS. 1 to 3 are also applied to the method of controlling the input gain of FIG. 4.

In operation S4100, the interference cancellation repeater 10 extracts a signal with constant magnitude regardless of a change in user traffic from a digitized RF input signal from which an interference signal has been canceled. The extracted signal may include at least one of a synchronization signal and a reference signal.

In operation S4300, the interference cancellation repeater 10 calculates a power value of the extracted signal. The power value of the extracted signal may correspond to current magnitude of the RF input signal.

In operation S4500, the interference cancellation repeater 10 compares the calculated power value with a reference power value to acquire a gain-adjusted value. The reference power value may be a rated input power value of the interference cancellation repeater 10 and the gain-adjusted value may be a value corresponding to a difference between the calculated power value and the reference power value.

In operation S4700, the interference cancellation repeater 10 adjusts a gain of the RF input signal according to the acquired gain-adjusted value. Accordingly, when the gain of the RF input signal changes, the interference cancellation repeater 10 may accurately identify a change due to fading and may adjust the gain of the RF input signal to a rated gain level so that service coverage may be maintained constant.

While the embodiments have been particularly shown and described, it will be understood by those of ordinary skill in the art that various changes in form and details may be made therein without departing from the scope of the inventive concept as defined by the appended claims.

The invention claimed is:

1. An interference cancellation repeater comprising at least one processor to implement:
   a first transmission/reception processing unit configured to adjust a gain of a radio frequency (RF) input signal input via a link antenna communicatively coupled to a base station;
   an interference canceller configured to cancel an interference signal from an output signal of the first transmission/reception processing unit; and
   a gain controller configured to extract a signal, which has a constant magnitude regardless of a change in user traffic, from an output signal of the interference canceller, and control the first transmission/reception processing unit such that the first transmission/reception unit adjusts the gain of the RF input signal to a predetermined level based on the extracted signal.

2. The interference cancellation repeater of claim 1, wherein
   the extracted signal is a synchronization signal for synchronization between the base station and a user terminal.

3. The interference cancellation repeater of claim 1, wherein
   the extracted signal is a reference signal of the base station.

4. The interference cancellation repeater of claim 1, wherein
   the gain controller comprises:
   an extractor configured to extract the signal with constant magnitude regardless of the change in user traffic from the output signal of the interference canceller;
   an acquirer configured to calculate a power value of the extracted signal, and compare the calculated power value with a predetermined reference power value to acquire a gain-adjusted value; and
   a controller configured to control the first transmission/reception processing unit such that the first transmission/reception processing unit adjusts the gain of the RF input signal according to the acquired gain-adjusted value.

5. The interference cancellation repeater of claim 4, wherein
   the reference power value is a rated input power value of the interference cancellation repeater.

6. The interference cancellation repeater of claim 1, wherein
   the first transmission/reception processing unit comprises:
   an amplifier configured to amplify the RF input signal by low-noise amplification;
   an attenuator configured to adjust a gain of the low-noise-amplified RF input signal; and
   an analog-to-digital converter configured to digitize the gain-adjusted RF input signal, wherein
   the gain controller is configured to adjust the gain of the RF input signal to a predetermined level by controlling the attenuator.

* * * * *